(12) United States Patent
Hironaka et al.

(10) Patent No.: US 12,222,957 B2
(45) Date of Patent: Feb. 11, 2025

(54) STORAGE SYSTEM AND DATA BACKUP PROCESSING METHOD IN STORAGE SYSTEM

(71) Applicant: Hitachi, Ltd., Tokyo (JP)

(72) Inventors: Kazuei Hironaka, Tokyo (JP); Masahiro Arai, Tokyo (JP); Akira Deguchi, Tokyo (JP)

(73) Assignee: Hitachi Vantara, Ltd., Kanagawa-ken (JP)

( * ) Notice: Subject to any disclaimer, the term of this patent is extended or adjusted under 35 U.S.C. 154(b) by 0 days.

(21) Appl. No.: 18/243,916

(22) Filed: Sep. 8, 2023

(65) Prior Publication Data

US 2024/0354312 A1 Oct. 24, 2024

(30) Foreign Application Priority Data

Apr. 19, 2023 (JP) .................................. 2023-068518

(51) Int. Cl.
*G06F 16/27* (2019.01)
*G06F 11/14* (2006.01)

(52) U.S. Cl.
CPC .......... *G06F 16/27* (2019.01); *G06F 11/1464* (2013.01); *G06F 2201/84* (2013.01)

(58) Field of Classification Search
CPC ...................................................... G06F 16/27
See application file for complete search history.

(56) References Cited

U.S. PATENT DOCUMENTS

| 7,152,079 | B2 | 12/2006 | Hirakawa et al. | |
| 10,747,624 | B2 | 8/2020 | Satoyama et al. | |
| 2018/0232286 | A1 | 8/2018 | Satoyama et al. | |
| 2020/0133523 | A1* | 4/2020 | Xia | G06F 3/0622 |
| 2022/0158932 | A1* | 5/2022 | Lam | H04L 45/38 |

FOREIGN PATENT DOCUMENTS

WO 2017/064770 A1 4/2017

OTHER PUBLICATIONS https://aws.amazon.com/jp/directconnect/ Jul. 10, 2023 (1 page).
https://aws.amazon.com/s3/ Jul. 10, 2023 (1 page).

* cited by examiner

*Primary Examiner* — Jay A Morrison
(74) *Attorney, Agent, or Firm* — Volpe Koenig

(57) ABSTRACT

To back up stored data of a storage device installed on-premise to a storage service provided by a public cloud more reliably and efficiently. A storage system according to the invention includes a storage device having first storage logical volumes (LDEVs), and a storage device having second storage LDEVs. When stored data of a first LDEV and stored data of a second LDEV are synchronized with each other, network conditions in a transfer path from the storage device to the public cloud and in a transfer path from the storage device to the public cloud are observed. The first LDEV or the second LDEV is selected as a backup source based on the network conditions.

4 Claims, 14 Drawing Sheets

FIG. 4
LDEV MANAGEMENT TABLE
<u>1171</u>

| LDEV NUMBER | LDEV CAPACITY | VOL TYPE | POOL NUMBER |
|---|---|---|---|
| 1 | 1TB | EVOL | 1 |
| 2 | 2B | TPVOL | 1 |
| 3 | 320GB | TPVOL | 1 |
| 4 | 500GB | RVOL | 2 |
| 5 | 250GB | TPVOL | 1 |
| ... | ... | ... | ... |

FIG. 5

REMOTE STORAGE MANAGEMENT TABLE
1172

| DESTINATION ID | AVAILABILITY | PAIR STORAGE ID | STORAGE TYPE | STORAGE MODEL | LOCATION INFORMATION | CONNECTION PORT | CONNECTION PROTOCOL | ADDRESS |
|---|---|---|---|---|---|---|---|---|
| 1 | YES | 10001 | Block | aaaa | Site A | a0 | FC | aa:bb:cc:dd:ee:ff:gg:hh....xx |
| 2 | NO | 10002 | NAS | bbbb | Site B | b0 | iSCSI | iqn.yyyy-mm.aaaa.bbbb.com |
| 3 | YES | 10003 | SDS-Block | cccc | Cloud B | c2 | iSCSI | iqn.yyyy-mm.aaaa.bbbb.net |
| 4 | YES | 10004 | Object | dddd | Cloud A | d2 | S3 | http://s3-xxxxxxxxx.com/ |
| ... | ... | ... | ... | ... | ... | ... | ... | |

REPLICATION MANAGEMENT TABLE
1173

| REPLICATION NUMBER | REPLICATION TYPE | DESTINATION ID | PVOL NUMBER | SVOL NUMBER | SYNCHRONIZATION METHOD | PAIR STATE |
|---|---|---|---|---|---|---|
| 1 | Remote | 1 | 1 | 1 | SYNC | PAIR |
| 2 | Remote | 2 | 2 | 2 | ASYNC | PSUS |
| 3 | Local | - | 3 | 4 | ASYNC | PAIR |
| ... | | ... | ... | ... | ... | ... |

FIG. 8

PATH MANAGEMENT TABLE
1175

| DESTINATION ID 601 | PATH ID 901 | AVAILABILITY 602 | NOMINAL DATA TRANSFER RATE 902 | ACTUAL DATA TRANSFER RATE 903 | DATA TRANSFER COST 904 |
|---|---|---|---|---|---|
| 1 | 1 | YES | 10Gbps | 3Gbps | 0.01 $/GB |
|   | 2 | NO | 10Gbps | 8Gbps | 0.01 $/GB |
|   | ⋮ | ⋮ | ⋮ | ⋮ | ⋮ |
| 2 | 1 | YES | 10Gbps | 2Gbps | 0.01 $/GB |
|   | 2 | YES | 10Gbps | 2Gbps | 0.00 $/GB |
|   | ⋮ | ⋮ | ⋮ | ⋮ | ⋮ |

FIG. 9

STORAGE DEVICE MANAGEMENT TABLE
211

| STORAGE ID | STORAGE TYPE | STORAGE MODEL | LOCATION INFORMATION | MANAGEMENT SYSTEM ADDRESS |
|---|---|---|---|---|
| 10001 | Block | aaaa | Site A | 172.16.10.1 |
| 10002 | NAS | bbbb | Site B | 172.16.20.1 |
| 10003 | SDS-Block | cccc | Cloud B | 172.16.30.1 |
| ... | ... | ... | ... | |

STORAGE SYSTEM AND DATA BACKUP PROCESSING METHOD IN STORAGE SYSTEM

BACKGROUND OF THE INVENTION

1. Field of the Invention

The invention relates to a storage system and a data backup processing method in a storage system.

2. Description of Related Art

In recent years, attention has been attracted to a method of constructing an IT system called a hybrid cloud in which both an on-premise IT system installed in a data center or the like and a service provided by a cloud vendor called a public cloud in an infrastructure-as-a-service (IaaS) type are combined.

The hybrid cloud is expected to improve flexibility of an IT infrastructure, to reduce an IT operation cost, and the like by using a cloud service provided by the hybrid cloud at an appropriate place while utilizing an IT system in the related art constructed on-premise.

The cloud vendor provides, as a communication unit efficiently using the hybrid cloud, a connection service using a dedicated line by which an on-premise data center and a data center operated by the cloud vendor are directly connected as disclosed In a storage system, a storage device implemented by software having a function equivalent to that of a storage device in the related art called software defined storage (SDS) is commercialized. Since the SDS is implemented by the software, the SDS can also be operated in the public cloud. By introduction of the SDS, it is possible to implement a storage function same as that of the storage device in the related art installed on-premise on the public cloud.

A user who uses SDS places importance on compatibility with various storage functions provided by the storage device in the related art. For a purpose of improving availability, reliability, and the flexibility of the IT system, a replication environment may be constructed in which stored data is used in synchronization between an on-premise storage device and SDS constructed in a public cloud using a storage function such as a remote replication function described in PTL 1. By using the remote replication function, it is possible to synchronize and use the same stored data between the on-premise and the public cloud, which is especially useful when constructing the hybrid cloud.

In a company, in order to deal with data of the IT system which continues to be increased, the user has a high interest in an inexpensive data storage unit, particularly, a unit for storing backup data which needs to be stored for a long period of time at a low cost. In particular, users who use the hybrid cloud have studied using a storage service provided by the public cloud as shown in NPL 2 as a unit of backing up and archiving data over a long period of time.

CITATION LIST

Patent Literature

PTL 1: U.S. Pat. No. 7,152,079B specification
PTL 2: WO2017/064770

Non Patent Literature

NPL 1: https://aws.amazon.com/jp/directconnect/
NPL 2: https://aws.amazon.com/s3/

SUMMARY OF THE INVENTION

Incidentally, the Internet is generally used as a unit for accessing the storage service provided by the public cloud. In a particularly inexpensive storage service called object storage, a service is provided using a communication protocol that uses an access technique such as a Hypertext Transport Protocol (HTTP).

However, since data transfer using the Internet passes through a public network, there is no guarantee of a band or the like as compared to a dedicated line or the like directly connecting data centers, and the data transfer is inferior in stability and reliability. Since the communication protocol using HTTP is not a communication protocol specialized for data transfer, overhead associated with the data transfer tends to increase, and it is not optimized for large-volume data transfer.

Therefore, for example, in a case of backing up stored data of the storage device installed on-premise to the storage service provided by the public cloud described above, a time required for the backup may be a long time and the backup may not be completed within an assumed time depending on an available bandwidth and congestion of the Internet. Alternatively, the backup itself may fail due to an excessive increase in communication delay.

The invention has been made in view of such a situation, and an object thereof is to provide a storage system capable of more reliably and efficiently backing up stored data of a storage device installed on-premise to a storage service provided by a public cloud, and a data backup processing method in the storage system.

A storage system according to the invention for solving the above problem includes a first storage device having a first logical volume, a second storage device having a second logical volume forming a remote replication pair with the first logical volume, and an integrated management device configured to manage the first storage device and the second storage device. Stored data of the first logical volume or stored data of the second logical volume is backed up to a storage service provided by a public cloud. When stored data of the first logical volume and stored data of the second logical volume are synchronized, the integrated management device or the first storage device selects, based on network conditions in a transfer path from the first storage device to the public cloud and in a transfer path from the second storage device to the public cloud, the first logical volume or the second logical volume as a backup source.

A data backup processing method according to the invention for solving the above problem is a data backup processing method in a storage system. The storage system includes a first storage device having a first logical volume and a second storage device having a second logical volume forming a remote replication pair with the first logical volume. The data backup processing method is used for backing up stored data of the first logical volume or stored data of the second logical volume to a storage service provided by a public cloud. The data backup processing method includes observing network conditions in a transfer path from the first storage device to the public cloud and in a transfer path from the second storage device to the public cloud when stored data of the first logical volume and stored data of the second logical volume are synchronized with each other, and selecting the first logical volume or the second logical volume as a backup source based on the network conditions.

According to the invention, stored data of a storage device installed on-premise can be more reliably and efficiently backed up to a storage service provided by a public cloud.

Problems, configurations, and effects other than those described above will be clarified by the description of the following embodiment.

BRIEF DESCRIPTION OF THE DRAWINGS

FIG. 4 is a diagram showing a configuration example of an LDEV management table in management information of a storage device according to the embodiment of the invention;

FIG. 5 is a diagram showing a configuration example of a remote storage management table in the management information of the storage device according to the embodiment of the invention;

FIG. 6 is a diagram showing a configuration example of a replication management table in the management information of the storage device according to the embodiment of the invention;

FIG. 8 is a diagram showing a configuration example of a path management table in the management information of the storage device according to the embodiment of the invention;

FIG. 9 is a diagram showing a configuration example of a storage device management table in the management information of the storage device according to the embodiment of the invention;

DESCRIPTION OF EMBODIMENTS

Figure 1:
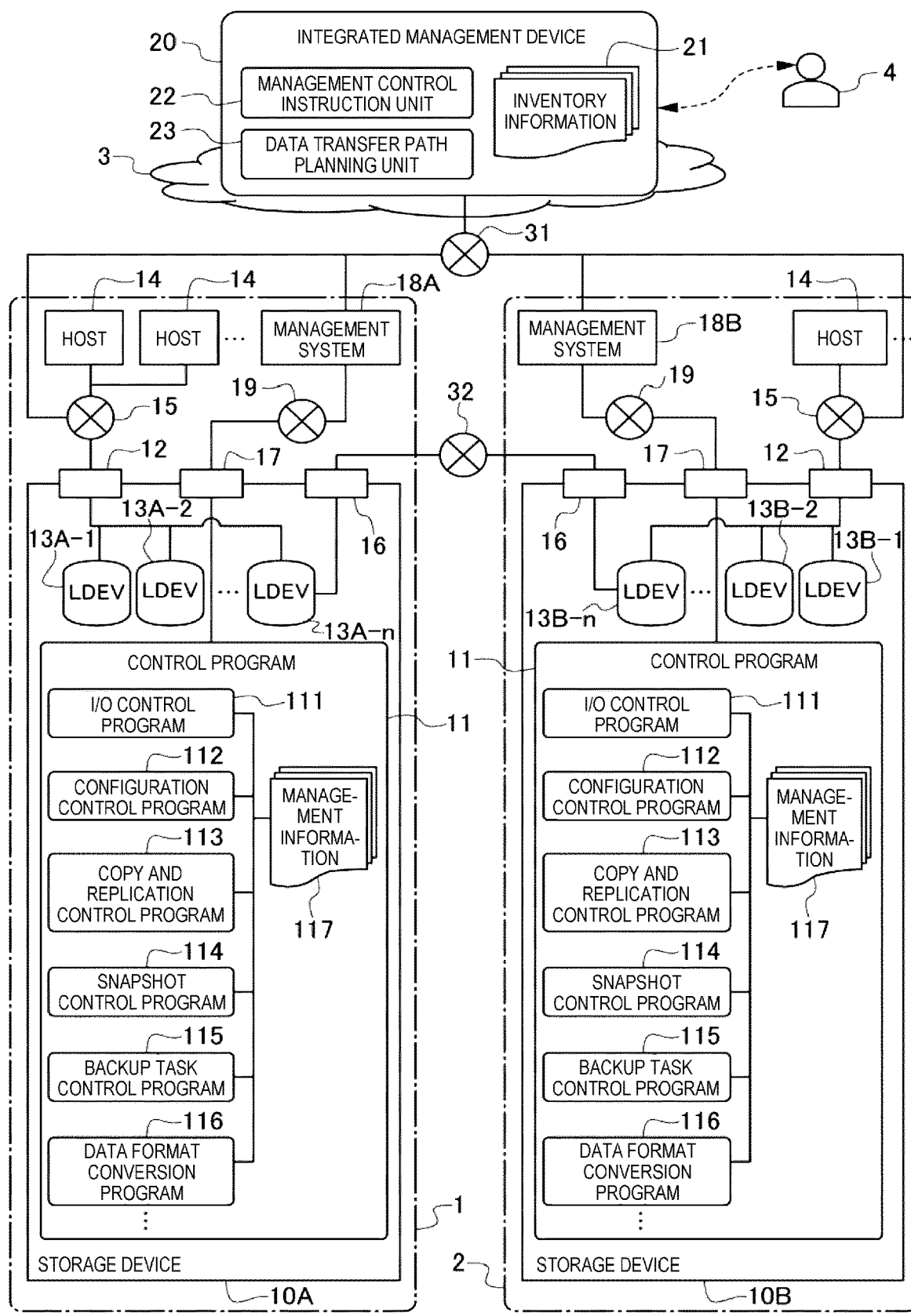
FIG. 1 is a block diagram showing an example of a configuration of a storage system according to an embodiment of the invention.

Hereinafter, an embodiment of the invention will be described with reference to the drawings. In the present description and the drawings, components having substantially the same function or configuration are designated by the same reference numerals, and redundant description will be omitted.

The embodiment described below does not limit the invention according to the claims, and all elements and combinations thereof described in the embodiment are not necessarily essential to the solution of the invention. In the following description, various kinds of information may be described by expressions such as "xxx table" and "xxx list", and various kinds of information may be expressed by a data structure other than a table, a list, and the like. Therefore, the "xxx table", the "xxx list", and the like may be referred to as "xxx information" to indicate that information does not depend on the data structure.

Further, a storage system according to the following embodiment of the invention may be implemented by software running on a general-purpose computer, or may be implemented by dedicated hardware or a combination of software and hardware.

Further, in the following description of the embodiment, processing may be described with a subject being a "program", and the program may be described with a processor as the subject because the program is executed by a processor (e.g., CPU: Central Processing Unit) to perform predetermined processing using a storage resource (e.g., memory), a communication interface (I/F), and a port.

Further, in the following description of the embodiment, a "volume (VOL)" indicates a storage area of a storage device, and may be implemented by a physical storage device or a logical storage device. The VOL may be a substantial VOL (RVOL) or a virtual VOL (VVOL).

The "RVOL" may be a VOL based on a physical storage resource (for example, one or more redundant array of independent disk (RAID) groups) in a storage device having the RVOL. The "VVOL" may be any of an external connection VOL (EVOL), a capacity expansion VOL (TPVOL), and a snapshot VOL (SSVOL). The EVOL is based on storage space (for example, VOL) of an external storage device, and may be a VOL according to a storage virtualization technique. The TPVOL includes a plurality of virtual areas (virtual storage areas), and may be a VOL according to a capacity virtualization technique (typically, thin provisioning). The SSVOL may be a VOL that holds snapshot data at a certain time point in a certain TPVOL.

In the following description of the embodiment, a VOL that is provided by the storage system to the host and is recognized by the host is referred to as "LDEV". An actual state of the "LDEV" is the VVOL or the RVOL.

In the following description of the embodiment, "primary VOL (PVOL)" may be the LDEV serving as an original volume for backup, replication, and snapshot, and "secondary VOL (SVOL)" may be the LDEV serving as a destination for backup, replication, and snapshot.

In the following description of the embodiment, the snapshot may be an SSVOL or a logical storage area that holds data at any time point of the VOL. A snapshot may be implemented by a method of collectively recording a difference in data updates performed on the VOL from a certain time point to a certain time point, or may be implemented by a journaling method of recording all data updates performed on the VOL in time series of data updates, or a continuous data protection (CDP) method.

Further, in the following description of the embodiment, remote replication is a function of synchronizing data of VOLs in two or more paired storages, and for example, may be implemented by reflecting data update to the PVOL in replication source storage to the SVOL in replication destination storage having the pair relation. The data reflection to the SVOL may be implemented by a SYNC method performed in synchronization with the data update to the PVOL, or may be implemented by an ASYNC method performed in non-synchronization with the data update to the PVOL.

Embodiment of the Invention

The storage system according to the embodiment of the invention is a typical example of a remote replication configuration. Remote replication is a technique for replicating stored data of a storage device to another storage device.

Configuration Example of Storage System

FIG. 1 is a block diagram showing an example of a configuration of the storage system according to the embodiment of the invention. The storage system according to the present embodiment includes a plurality of sites, for example, a primary site 1 and a secondary site 2 to configure the remote replication. The primary site 1 and the secondary site 2 construct the remote replication.

The primary site 1 includes a storage device 10A, a host interface device 12, one or more hosts 14, a host network 15, a management system 18A, and a management network 19. The storage device 10A includes a control program 11, the host interface device 12, storage logical volume LDEVs 13A-1 to 13A-n, a replication interface device 16, and a management interface device 17. The storage device 10A is an example of a first storage device described in the claims.

The secondary site 2 includes a storage device 10B, a host interface device 12, one or more hosts 14, a host network 15, a management system 18B, and a management network 19. The storage device 10B includes a control program 11, a host interface device 12, storage logical volume LDEVs 13B-1 to 13B-n, a replication interface device 16, and a management interface device 17. The storage device 10B is an example of a second storage device described in the claims.

In the primary site 1 and the secondary site 2, components having the same function are denoted by the same reference numerals. In the primary site 1 and the secondary site 2 of the remote replication configuration, the storage devices 10A and 10B with the same configuration are often used for construction. In constructing the remote replication, it is unnecessary to make the configurations of the storage devices 10A and 10B uniform, and the host 14 does not necessarily exist on a secondary site 2 side.

The storage device 10A and the storage device 10B are connected to each other via a replication network 32. As the replication network 32, typically, a dedicated line network or a network using a virtual private network (VPN) technique can be used.

In the primary site 1 and the secondary site 2, the host interface device 12 connects the storage devices 10A and 10B and the host network 15. One or more hosts 14 are connected to the storage devices 10A and 10B via the host network 15.

Here, the host is an abbreviation of a host system, and is typically a computer such as a virtual or physical server or a mainframe. The host interface device 12 is, for example, a host bus adapter (HBA) or a network interface card (NIC). The host network 15 is, for example, a fibre channel (FC) or an Internet small computer system interface (iSCSI).

The replication interface device 16 connects the storage devices 10A and 10B and the replication network 32. Accordingly, the storage device 10A and the storage device 10B are connected to each other via the replication network 32. The replication interface device 16 is, for example, an HBA or an NIC.

The management interface device 17 connects the storage devices 10A and 10B and the management network 19. Accordingly, the management system 18A is connected to the storage device 10A via the management network 19 and the management system 18B is connected to the storage device 10B via the management network 19. The management interface device 17 is, for example, an NIC. The management network 19 is, for example, Ethernet (registered trademark).

The storage devices 10A and 10B are typically physical devices implemented by hardware, but may be SDS in which the same function is implemented by software as described above. A platform on which the SDS is executed may be a computer such as a virtual or physical server.

In the storage devices 10A and 10B, the host 14 accesses the storage logical volume LDEVs 13A-1 to 13A-n of the storage device 10A via the host network 15 and the host 14 accesses the storage logical volume LDEVs 13B-1 to 13B-n of the storage device 10B via the host network 15.

The control programs 11 of the storage devices 10A and 10B may be implemented, for example, as programs executed by a central processing unit (CPU) mounted on the storage devices, or may be implemented as programs executed by a computational resource of a platform on which the SDS is executed when the storage devices 10A and 10B are the SDS.

The control program 11 includes, for example, an I/O control program 111, a configuration control program 112, a copy and replication control program 113, a snapshot control program 114, a backup task control program 115, and a data format conversion program 116. These programs are controlled using management information 117 in the storage devices 10A and 10B.

In the control program 11, the I/O control program 111 is a program for controlling input and output of stored data of the storage devices 10A and 10B in response to a request from the host 14. The configuration control program 112 is a program for controlling a configuration and a state of the storage device 10A in response to a request from the management system 18A and controlling a configuration and a state of the storage device 10B in response to a request from the management system 18B. The copy and replication control program 113 is a program for controlling data copy (replication) of a certain logical volume.

The snapshot control program 114 is a program for converting a stored data format of the certain logical volume into, for example, a single file on a file system, creating a snapshot for holding a data static point at a certain time point of the certain logical volume, and restoring data from the snapshot. The backup task control program 115 is a program for controlling a task for backing up a content of a logical volume in a planned manner using the snapshot or the like. The data format conversion program 116 is a program for performing mutual conversion on the stored data format in which data is converted into an object of object storage that handles data in units of objects.

The management systems 18A and 18B have management functions for managing the configurations and states of the storage devices 10A and 10B. The management systems 18A and 18B manage the configurations and states of the storage devices 10A and 10B by transmitting commands for operating the configurations of the storage devices 10A and 10B to the control program 11 and receiving responses from the storage devices 10A and 10B.

The storage system according to the present embodiment includes, in addition to the storage devices 10A and 10B, an integrated management device 20 that operates in a cloud 3 or the like. The integrated management device 20 is connected to the management system 18A of the storage device 10A and the management system 18B of the storage device 10B via the Internet 31.

The integrated management device 20 is a device for integrally monitoring and managing the storage devices 10A and 10B managed by a storage administrator 4. Specifically, the integrated management device 20 is a device having a function of collecting and instructing configuration settings and states of the storage devices 10A and 10B connected to the respective sites (data centers) and the cloud 3 via the management system 18A of the storage device 10A and the management system 18B of the storage device 10B in response to an operation request from the storage administrator 4, and performing operation management.

The integrated management device 20 manages, as inventory information 21, types of the storage devices 10A and 10B managed by the integrated management device 20 and various kinds of management information such as set location information, operation information, and pair management information.

The integrated management device 20 includes a management control instruction unit 22 and a data transfer path planning unit 23. The management control instruction unit 22 collects information for backup path planning. The data transfer path planning unit 23 collects information for data transfer path planning.

The management systems 18A and 18B and the integrated management device 20 may be implemented as software executed on a server or a personal computer. The management systems 18A and 18B and the integrated management device 20 may be executed on a computer such as a server installed in the storage devices 10A and 10B or in the same site installed in the storage devices 10A and 10B, or may be implemented on the cloud 3.

Here, a case, in which the storage device 10A and the storage device 10B configure the remote replication which is a technique of replicating the stored data of each storage device to another storage device, is considered.

In the remote replication, a certain site of the storage device 10A which is a data replication source is set as the primary site 1, and a certain site of the storage device 10B which is a data replication destination is set as the secondary site 2. The primary site 1 can also be called an original site or a local site, and the secondary site 2 can also be called a subsite or a remote site.

Further, the LDEVs 13A-1 to 13A-n of the data replication source in the primary site 1 are referred to as a primary volume PVOL 300, and the LDEVs 13B-1 to 13B-n of the data replication destination in the secondary site 2 are referred to as a secondary volume SVOL 301. Further, a relation between the PVOL 300 and the SVOL 301 is called a pair.

For example, when an LDEV 13A-2 and an LDEV 13B-2 are in a pair relation, the copy and replication control program 113 of the storage device 10A transmits stored data of the LDEV 13A-2 from the host 14 to the storage device 10B via the replication network 32. The copy and replication control program 113 of the storage device 10B stores data in the LDEV 13B-2 that is paired with the LDEV 13A-2.

In this way, the remote replication is implemented between the primary site 1 and the secondary site 2 by copying the data of the LDEV 13A-2 to the LDEV 13B-2.

Configuration Example of Management Information

Figure 2:
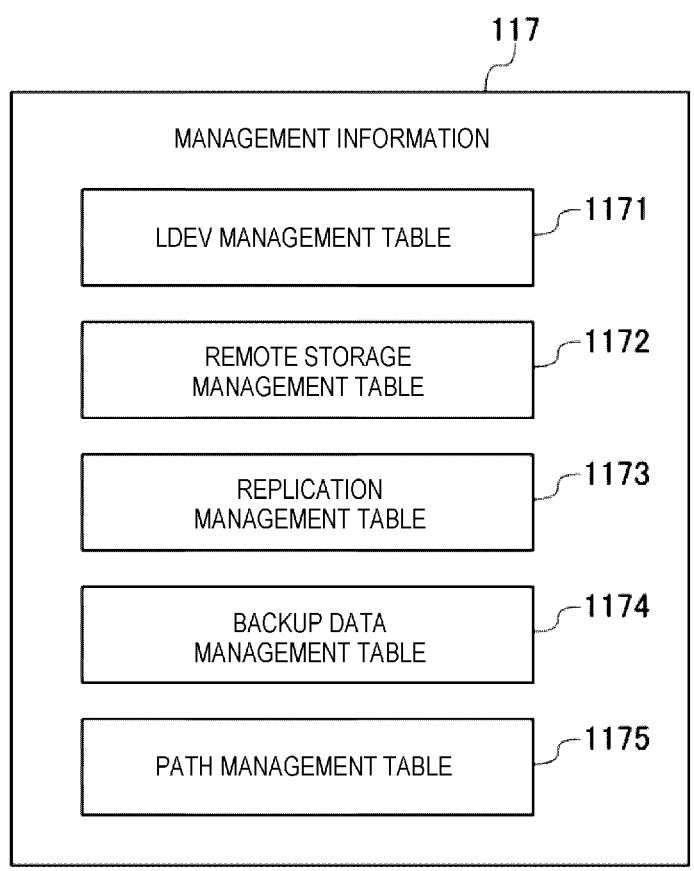
FIG. 2 is a diagram showing a configuration example of management information of the storage system according to the embodiment of the invention.

FIG. 2 is a diagram showing a configuration example of the management information 117 of the storage devices 10A and 10B according to the embodiment of the invention.

The management information 117 includes a plurality of management tables used for a control program 11A in the storage device 10A and a control program 11B in the storage device 10B. The plurality of management tables are tables such as an LDEV management table 1171, a remote storage management table 1172, a replication management table 1173, a backup data management table 1174, and a path management table 1175.

The LDEV management table 1171 holds information related to logical volumes LDEVs 13A-1 to 13A-n in the storage device 10A and logical volumes LDEVs 13B-1 to 13B-n in the storage device 10B. The remote storage management table 1172 manages information of another storage device 10B connected to the storage device 10A. The replication management table 1173 manages information on replication relations of the LDEVs 13A-1 to 13A-n and 13B-1 to 13B-n. The backup data management table 1174 manages backup information of the LDEVs 13A-1 to 13A-n and 13B-1 to 13B-n. The path management table 1175 manages backup path information of the LDEVs 13.

Configuration Example of Inventory Information in Integrated Management Device

Figure 3:
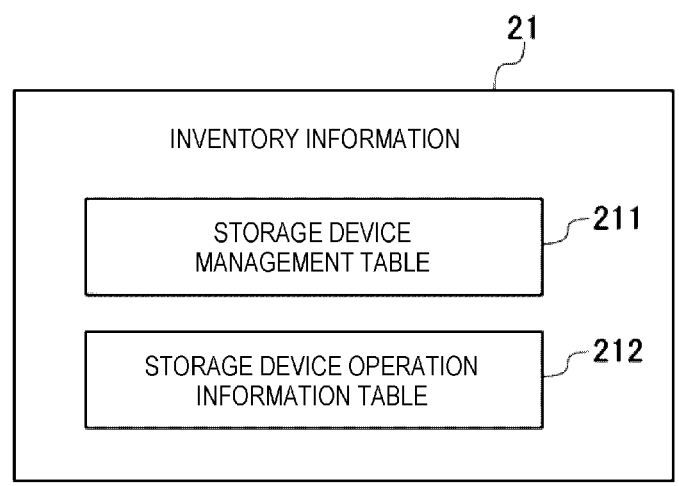
FIG. 3 is a diagram showing a configuration example of inventory information in an integrated management device according to the embodiment of the invention.

FIG. 3 is a diagram showing a configuration example of the inventory information 21 in the integrated management device 20 according to the embodiment of the invention.

The inventory information 21 includes a plurality of management tables used for the integrated management device 20. The plurality of management tables are, for example, tables such as a storage device management table 211 and a storage device operation information table 212.

The storage device management table 211 holds information of the storage devices 10A and 10B to be managed and monitored. The storage device operation information table 212 holds operation information of the storage devices 10A and 10B to be managed and monitored.

Configuration Example of LDEV Management Table in Management Information

FIG. 4 is a diagram showing a configuration example of the LDEV management table 1171 in the management information 117 of the storage devices 10A and 10B according to the embodiment of the invention.

The LDEV management table 1171 has an entry (record) for each logical volume LDEV 13 (13A-1 to 13A-n and 13B-1 to 13B-n) managed by the storage devices 10A and 10B. Information stored in each entry is an LDEV number 501, an LDEV capacity 502, a VOL type 503, and a pool number 504.

The LDEV number 501 represents an identification number of the LDEV 13. The LDEV capacity 502 represents a capacity of the LDEV 13 of the entry. The VOL type 503 represents the type of LDEV 13 of the entry, and is, for example, RVOL, TPVOL, SSVOL, or JNLVOL. The pool number 504 represents an identification number of a capacity pool associated with the LDEV 13 of the entry. A data storage area of the LDEV 13 is allocated from an area in the capacity pool associated with the pool number 504.

Configuration Example of Remote Storage Management Table in Management Information FIG. 5 is a diagram showing a configuration example of the remote storage management table 1172 in the management information 117 of the storage devices 10A and 10B according to the embodiment of the invention.

The remote storage management table 1172 is a table for managing relation information of the storage devices 10A and 10B serving as destinations when remote replication between the storage devices 10A and 10B or backup to a cloud is configured.

The remote storage management table 1172 includes an entry (record) for each destination device. Information stored in each entry is information such as a destination ID 601, an availability 602, a pair storage ID 603, a storage type 604, a storage model 605, location information 606, a connection port 607, a connection protocol 608, and an address 609.

The destination ID 601 is an identification number managed by the storage devices 10A and 10B as the destination for the remote replication or the backup. The availability 602 is a flag for identifying whether the destination is available, and is, for example, "yes" if available and "no" if unavailable. The pair storage ID 603 is an identification number for identifying the storage devices 10A and 10B that are in the destination relation.

The storage type 604 is information for identifying types of the storage devices 10A and 10B that are in the destination relation, and is, for example, "Block" in a case of general block storage, "NAS" in a case of network-attached storage, "SDS-Block" in a case of SDS-type block storage, and "Object" in a case of object storage.

The storage model 605 is information for identifying models of the storage devices 10A and 10B that are in the destination relation. The location information 606 is information for identifying a location of the data center (site), the cloud, or the like on which the storage devices 10A and 10B that are in the destination relation are installed. The connection port 607 is information indicating to which connection interface the storage devices 10A and 10B that are in the destination relation are connected.

The connection protocol 608 is protocol information used for communication with the storage devices 10A and 10B that are in the destination relation, and is, for example, "FC" in a case of a fibre channel protocol, "iSCSI" in a case of an iSCSI protocol, and "S3" in a case of an object storage protocol using HTTP. The address 609 is address information for accessing the storage devices 10A and 10B that are in the destination relation.

Configuration Example of Replication Management Table in Management Information

FIG. 6 is a diagram showing a configuration example of the replication management table 1173 in the management information 117 of the storage devices 10A and 10B according to the embodiment of the invention.

The replication management table 1173 is a table for managing remote replication configured between different storage devices 10A and 10B and local replication configured in a single storage device 10A or 10B.

The replication management table 1173 has an entry (record) for each pair of LDEVs 13A and 13B for replication. Information stored in each entry is information such as a replication number 701, a replication type 702, the above destination ID 601, a PVOL number 703, an SVOL number 704, a synchronization method 705, and a pair state 706.

The replication number 701 is an identification number for identifying replication. The replication type 702 indicates a type of replication. For example, the replication type 702 is "Remote" in a case of the remote replication configured between different storage devices 10A and 10B, and is "Local" in a case of the local replication configured in a single storage device 10A or 10B.

The destination ID 601 is an ID for identifying a destination used for the replication. The PVOL number 703 is a number of the LDEVs 13A-1 to 13A-n of the PVOL 300 having the pair relation of the replication. The SVOL number 704 is a number of the LDEVs 13B-1 to 13B-n of the SVOL 301 having the pair relation of the replication.

The synchronization method 705 is a method of synchronizing stored data of the PVOL 300 for replication and stored data of the SVOL 301, and is, for example, "ASYNC" when the SVOL 301 is non-synchronously synchronized with the update of the PVOL 300, and "SYNC" when the SVOL 301 is synchronously synchronized with the update of the PVOL 300.

The pair state 706 represents a synchronization state between the PVOL 300 for replication and the SVOL 301, and is, for example, "PAIR" when the PVOL 300 and the SVOL 301 are in the synchronization state, and is "PSUS" when the PVOL 300 and the SVOL 301 are in a non-synchronization state.

Configuration Example of Backup Data Management Table in Management Information

Figure 7:
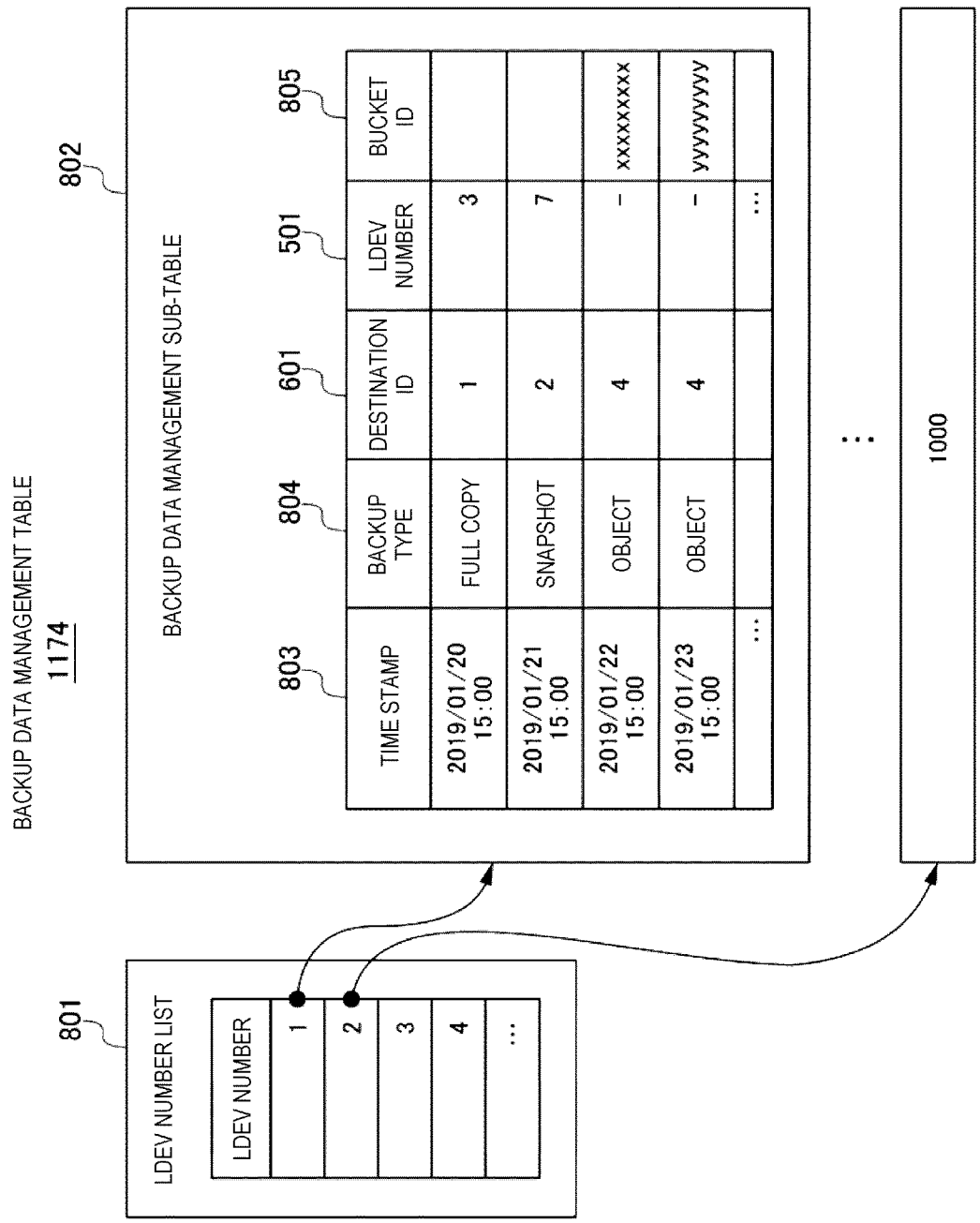
FIG. 7 is a diagram showing a configuration example of a backup data management table in the management information of the storage device according to the embodiment of the invention.

FIG. 7 is a diagram showing a configuration example of the backup data management table 1174 in the management information 117 of the storage devices 10A and 10B according to the embodiment of the invention.

The backup data management table 1174 has a list 801 of LDEV numbers 501 and a backup data management sub-table 802 for managing snapshot data for each LDEV number 501.

The backup data management sub-table 802 has an entry for backup management information in a target LDEV 13 for each time stamp 803. A backup type 804 is a type indicating a backup method. For example, a case in which the stored data of the LDEV 13 is stored in another LDEV 13 by full copy is called "full copy", a case in which only difference data is stored in the SSVOL as a snapshot is called "snapshot", and a case in which the stored data is stored, as an object, in the object storage is called "object".

The destination ID 601 is an ID for identifying the storage device 10A or 10B as a backup destination. The LDEV number 501 is a number of the storage device 10A or 10B of the backup destination. A bucket ID 805 is an ID for identifying a bucket of the backup destination when the backup destination is the object storage.

Configuration Example of Path Management Table in Management Information

FIG. 8 is a diagram showing a configuration example of the path management table 1175 in the management information 117 of the storage devices 10A and 10B according to the embodiment of the invention.

The path management table 1175 is a table for managing a path that can be used to access to the storage device 10A or 10B designated by the destination ID 601 when the storage devices 10A and 10B perform remote backup or the remote replication.

The path management table 1175 has an entry (record) for each destination ID 601, and holds one or more pieces of path information for one destination ID 601. A path ID 901 is an identification ID for identifying the path information to the storage device 10A or 10B indicated by the destination ID 601. The availability 602 is a flag indicating whether the path is available.

A nominal data transfer rate 902 is a theoretical data transfer rate value of the path. An actual data transfer rate 903 is an actual data transfer rate value obtained from an actual result in the past using the path. When a degree of achievement of the actual data transfer rate 903 is equal to or less than a predetermined threshold value with respect to the nominal data transfer rate 902, the transfer path indicates that a service level of the transfer path is low. The actual data transfer rate 903 is updated at any time when the path is used, thereby obtaining an actual data transfer rate performance value. A data transfer cost 904 is a unit cost when data is transferred using the path.

Configuration Example of Storage Device Management Table in Management Information FIG. 9 is a diagram showing a configuration example of the storage device management table 211 in the management information 117 of the storage devices 10A and 10B according to the embodiment of the invention.

The storage device management table 211 is information managed by the inventory information 21 of the integrated management device 20. That is, the storage device management table 211 manages information of the storage devices 10A and 10B which are monitoring and management targets of the integrated management device 20.

By registering the storage devices 10A and 10B to be managed in the table, the storage administrator 4 can monitor and manage a plurality of storage devices 10A and 10B unitarily installed in different sites by the integrated management device 20 in an integrated manner.

The storage device management table 211 has an entry (record) for each of the storage devices 10A and 10B. The storage ID 1001 is an ID for identifying the storage devices 10A and 10B to be monitored. The storage type 604 is information for identifying the types of the storage devices 10A and 10B to be monitored. For example, the storage type is the "Block" in a case of general block storage, the "NAS" in a case of network-attached storage, the "SDS-Block" in a case of SDS-type block storage, and the "Object" in a case of the object storage.

The storage model 605 is information for identifying models of the storage devices 10A and 10B to be monitored. The location information 606 is information for identifying the location of the data center (site), the cloud, or the like on which the storage devices 10A and 10B to be monitored are installed. A management system address 1002 is information indicating addresses of the management systems 18A and 18B.

Example of Performing Data Backup on Storage Service on Cloud

Figure 10:
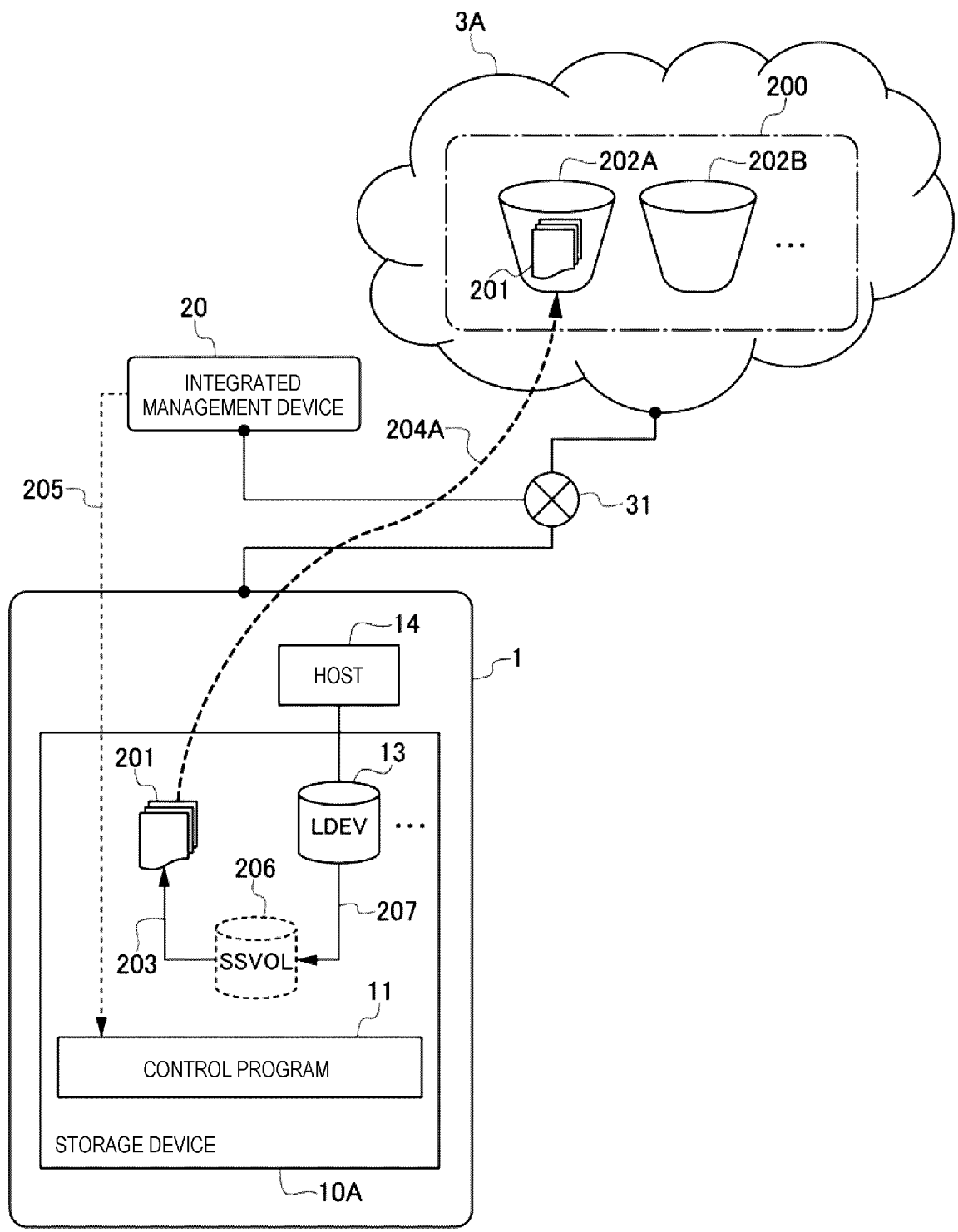
FIG. 10 is a diagram schematically showing an example of data backup to object storage provided in a cloud.

FIG. 10 is a diagram schematically showing an example of data backup to the object storage provided on the cloud. FIG. 10 shows a state in which the stored data is backed up to object storage 200 in a cloud 3A (public cloud) operated by a cloud vendor in the storage system RVOL.

The object storage 200 is generally a storage device or a service characterized by managing the stored data in units of objects 201, and manages the stored data by assigning metadata and IDs for identifying the stored data in units of objects 201. In the object storage 200, the plurality of objects 201 are managed in units of buckets 202 (202A and 202B).

The object storage 200 provided by the cloud vendor is suitable for storing large-volume data at a low cost because there is generally no limitation on the capacity of stored data, and is also attracting attention for data backup and archive use.

The storage administrator 4 or the like operates the integrated management device 20, whereby a backup instruction 205 is issued from the integrated management device 20 to the storage device 10A. After receiving the backup instruction 205, the control program 11 of the storage device 10A starts processing for backing up the LDEV 13 to the bucket 202A in the object storage 200.

Specifically, the control program 11 of the storage device 10A first creates a snapshot holding stored data at a backup time of the LDEV 13 to be backed up as the SSVOL 206, and starts backup processing for the bucket 202A of the object storage 200 with the SSVOL 206 as the target.

Further, in order to back up the stored data of the logical volume such as the LDEV 13 of the storage device 10A and the SSVOL 206 to the object storage 200, it is necessary to change a data format to divide the stored data into one or more objects 201 and store the object. The data conversion processing is performed through a processing path 203.

The data conversion processing through the processing path 203 is performed by, for example, the data format conversion program 116 of the control program 11, and the stored data of the SSVOL 206 is converted into the object 201. As another implementation method, a method in which the data format conversion program 116 is executed on the host 14 connected to the storage device 10A to convert the stored data of the SSVOL 206 into the object 201 is also considered. Further, in recent years, an implementation method of performing data conversion processing on a network by executing the data format conversion program 116 using a data processing unit (DPU) or the like mounted on a network interface such as an NIC is also considered.

The stored data of the SSVOL 206 converted into one or more objects 201 is transferred by the copy and replication control program 113 of the control program 11 and stored in the bucket 202 (202A in the example) of the storage destination of the object storage 200. The transfer processing may be performed by executing the copy and replication control program 113 by the DPU described above.

Since the storage device 10A and the cloud 3A are connected via the Internet 31, it is necessary to perform data transfer using the Internet 31 as in the transfer path 204A. In the object storage 200, since an operation application program interface (API) such as representational state transfer (REST) using HTTP access is generally provided, an access protocol using HTTP is used to transfer data of the objects 201.

In the data transfer between the storage device 10A and the cloud 3A, depending on a situation of the Internet 31 to be used, a bandwidth that can be used may be unintentionally small due to congestion, or a communication response may deteriorate during the backup, and it is assumed that a time taken for the backup processing is affected. In particular, in a use case in which the large-volume data for enterprise use is backed up, it is necessary to finish processing related to the backup within a scheduled backup processing time in advance, and thus it is assumed that the operation is hindered.

Next, a specific example of data backup to a cloud service using remote replication will be described.

Example 1

Figure 11:
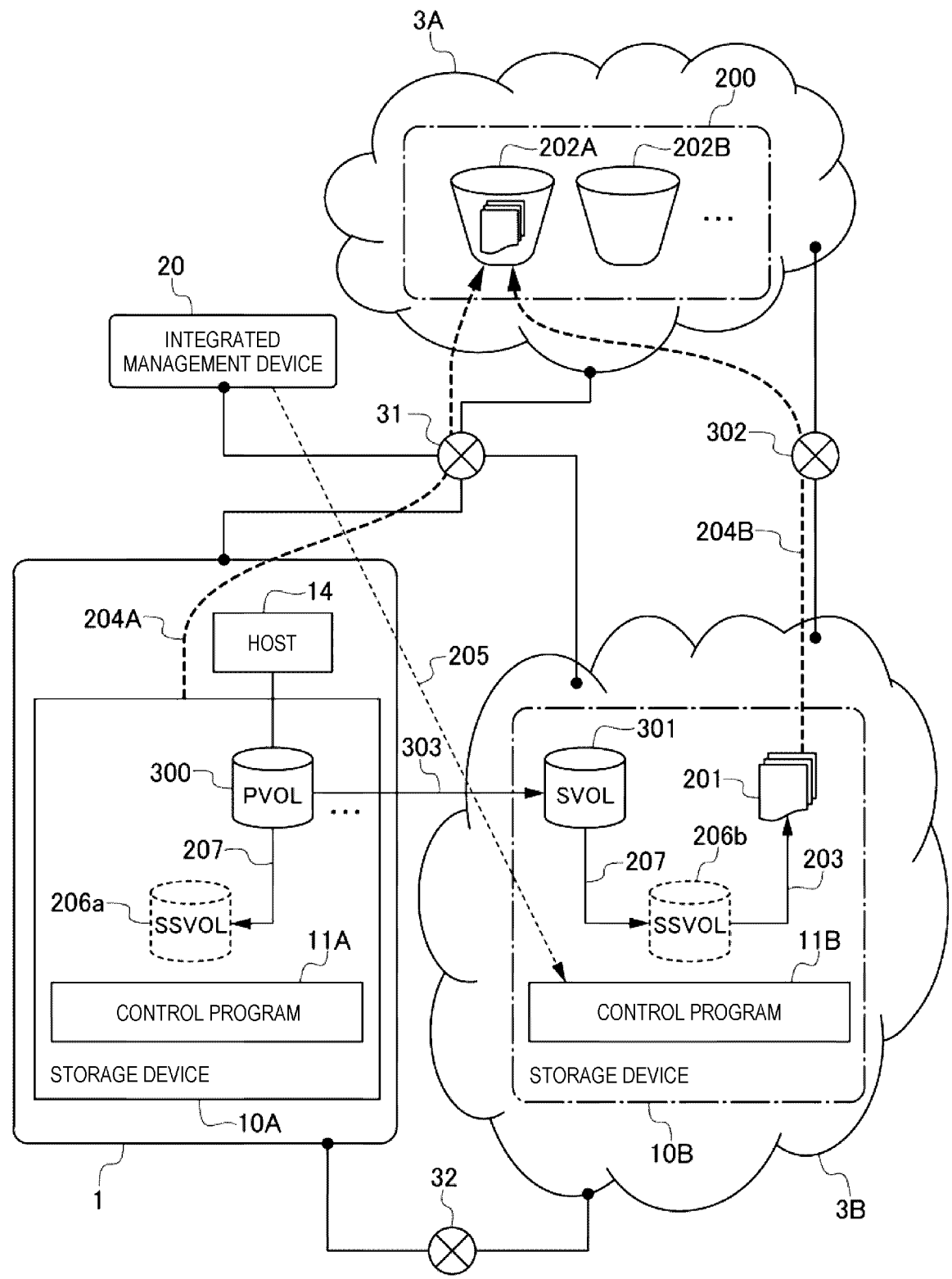
FIG. 11 is a diagram schematically showing data backup to a cloud service using remote replication according to Example 1 in the embodiment of the invention.

FIG. 11 is a diagram schematically showing data backup to a cloud service using remote replication according to Example 1 in the embodiment of the invention.

In FIG. 11, the storage device 10A installed in the primary site 1 and the storage device 10B installed in the cloud 3B are connected via the replication network 32 using a dedicated line.

Here, for example, the storage device 10B is operated as the SDS operating on the cloud 3B, and has a storage function equivalent to that of the storage device 10A.

Remote replication 303 is configured between the PVOL 300 of the storage device 10A and the SVOL 301 of the storage device 10B. The data updated from the host 14 to the PVOL 300 is copied synchronously or non-synchronously to the SVOL 301 having the pair relation via the replication network 32, thereby performing replication.

The cloud 3A and the cloud 3B are operated by, for example, the same cloud operator. Therefore, the cloud 3A and the cloud 3B are connected to the same network via an inter-cloud network.

Generally, the inter-cloud network is a network for connecting geographically the same or different clouds. A network bandwidth that can be used for data communication and communication latency are subject to service level assurance (SLA) using a technique such as quality of service (QOS) control of the network.

Here, a case is considered in which the data of the PVOL 300 of the storage device 10A to which the host 14 is connected is backed up to the bucket 202A of the object storage 200 in the public cloud (cloud 3A) operated by the cloud vendor.

As in the case of FIG. 10, the storage administrator 4 or the like operates the integrated management device 20, whereby the integrated management device 20 starts backup processing of the PVOL 300 to the bucket 202A.

At this time, the integrated management device 20 refers to, from the inventory information 21, information of the primary site 1 in which the storage device 10A is installed and information of the cloud 3B in which the storage device 10B having a pair relation with the storage device 10A is operating.

Next, the integrated management device 20 specifies presence of the SVOL 301 having the pair relation with the PVOL 300 in the remote replication 303.

Next, the integrated management device 20 determines a pair condition between the PVOL 300 and the SVOL 301. The determination is made because, for example, even though the PVOL 300 and the SVOL 301 are in the pair relation, the update data to the PVOL 300 is reflected to the SVOL 301 non-synchronously or synchronously, and thus the data is not necessarily synchronized depending on a timing. Therefore, it is determined whether the data of the PVOL 300 is completely synchronized with the SVOL 301.

Here, when the data of the PVOL 300 at a backup target time point is reflected in the SVOL 301 and is synchronized, it is determined that there is no problem even though the SVOL 301 is used as a backup source. That is, the integrated management device 20 issues the backup instruction 205 to the storage device 10B and causes the SVOL 301 to be backed up in the bucket 202A. As a result, it is possible to obtain the same result as when the PVOL 300 is backed up in the bucket 202A.

In the remote replication, at a time point when the update data of the PVOL 300 and the stored data of the SVOL 301 are synchronized up to a certain time point, a snapshot SSVOL 206a of the PVOL 300 and a snapshot SSVOL 206b of the SVOL 301 are acquired using a known technique (for example, see PTL 2) of acquiring a snapshot in which the PVOL 300 and the SVOL 301 are synchronized.

Next, the integrated management device 20 determines which of the primary site 1 and the cloud 3B has the lowest data transfer cost 904 (see FIG. 8) based on the network condition and a path selection policy as the data transfer unit to the cloud 3A that is the backup destination. For example, the data transfer unit in FIG. 10 includes two options such as the transfer path 204A and the transfer path 204B. The transfer path 204A uses the SSVOL 206a as the backup source and accesses the bucket 202A in the cloud 3A via the Internet 31. On the other hand, the transfer path 204B uses the SSVOL 206b as the backup source and accesses the bucket 202A of the cloud 3A via the inter-cloud network 302 connecting the cloud 3A and the cloud 3B.

Here, the network state is, specifically, one of or preferably both of a network bandwidth and a communication line latency that are actually available at the current time point in a transfer path (communication path). The data transfer cost 904 is, specifically, at least one of a data transfer time and a network usage fee corresponding to the network state and the amount of backup data, preferably both of the data transfer time and the network usage fee. Specifically, the path selection policy is, for example, whether the backup time is prioritized, the communication cost reduction is prioritized, or both are prioritized.

Specifically, when the backup time is prioritized, the transfer path 204A passes through the Internet 31, and thus the available data bandwidth is 10 Gbps at most. Since the transfer path 204B passes through the inter-cloud network 302, when the available data bandwidth is 100 Gbps and there is bandwidth compensation based on QoS, the integrated management device 20 determines that selecting the transfer path 204B can shorten the time required for the backup processing. The integrated management device 20 issues the backup instruction 205 to the storage device 10B, thereby reducing the time required for the backup processing.

For example, when the usage fee of the inter-cloud network 302 changes according to a transfer data amount, the integrated management device 20 determines that selecting the transfer path 204A can reduce a monetary cost required for the backup processing. The integrated management device 20 issues the backup instruction 205 for the backup processing on the transfer path 204A to the storage device 10A. Accordingly, the monetary cost required for the backup processing can be reduced. This is because, for example, when the cloud 3A and the cloud 3B are provided by different cloud vendors, although there is the inter-cloud network 302, it may be preferable to use the transfer path 204A rather than the transfer path 204B if the usage fee is high.

There may be a case in which the transfer path 204A and the transfer path 204B are combined. Specifically, a case in which the backup target is a plurality of LDEVs 13 and the transfer path 204A and the transfer path 204B are selectively used according to the LDEV 13 to be processed, is also considered.

As described above, in the data backup to the cloud service using the remote replication according to Example 1, under the control of the integrated management device 20, the data backup to the cloud 3A is performed using the pair relation of the remote replication 303. Accordingly, more stable and faster backup processing can be implemented.

Example 2

Figure 12:
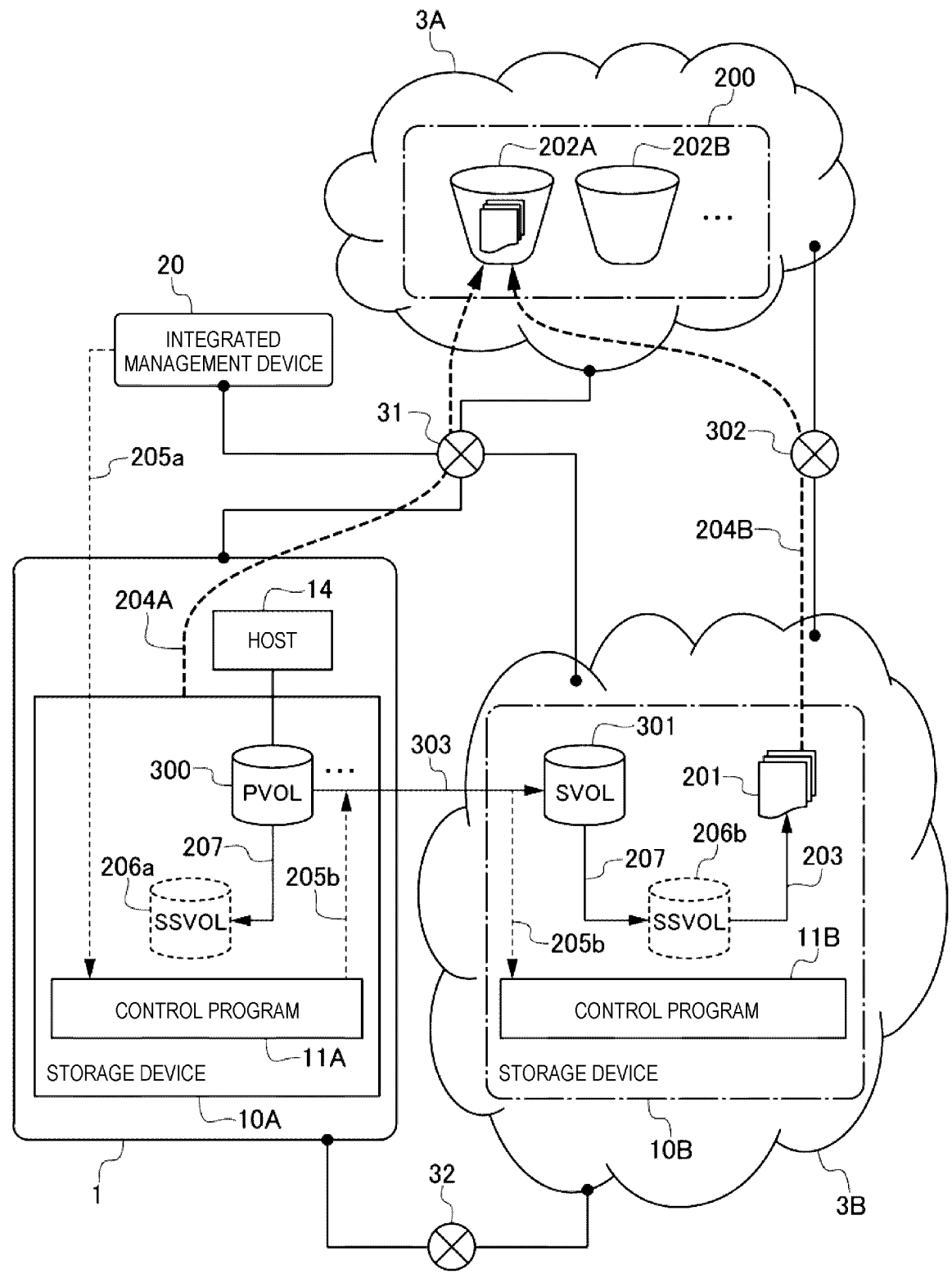
FIG. 12 is a diagram schematically showing data backup to a cloud service using remote replication according to Example 2 in the embodiment of the invention.

FIG. 12 is a diagram schematically showing the data backup to the cloud service using the remote replication according to Example 2 in the embodiment of the invention.

In Example 1 described above, the integrated management device 20 determines the transfer path 204A or 204B to be used for backup, and issues the backup instruction 205 to the storage device 10A or 10B. In contrast, Example 2 is an example in which the storage device 10A mainly determines the same transfer path 204A or 204B.

In Example 2, the storage device 10A receives the backup instruction 205a from the integrated management device 20. After receiving the backup instruction 205a, the control program 11A of the storage device 10A specifies the storage device 10B having the pair relation with its own storage device 10A, and specifies the SVOL 301 having the pair relation with the PVOL 300 to be backed up from the management information 117.

Next, the control program 11A confirms a pair condition between the PVOL 300 and the SVOL 301, determines whether the data of the PVOL 300 is completely synchronized with the SVOL 301, and then determines which of its own storage device 10A and the storage device 10B having the pair relation has the lower communication cost in communication with the cloud 3A.

A weight of the communication cost may be qualitatively determined in advance, or may be a weight based on a measurement result of actual communication with the cloud 3A in the storage device 10A and the storage device 10B.

Next, the control program 11A of the storage device 10A selects the transfer path 204A or the transfer path 204B based on the communication cost described above, whichever has the lower communication cost. Here, it is assumed that the transfer path 204B is selected.

Next, the control program 11A of the storage device 10A issues the backup instruction 205b to the storage device 10B having the pair relation. At this time, the backup instruction 205b may be transmitted as a part of a command for controlling replication on the communication path configuring the remote replication 303. The control program 11A of the storage device 10A and the control program 11B of the storage device 10B may transmit and receive commands via the Internet 31 or the replication network 32.

The control program 11B of the storage device 10B that has received the backup instruction 205b acquires a snapshot of the SVOL 301 having the pair relation with the PVOL 300, and creates the SSVOL 206b. In order to back up stored data to the bucket 202A, data conversion is performed on the stored data of the SSVOL 206b to generate an object 201. The data conversion processing is performed through the processing path 203.

Next, the control program 11B of the storage device 10B completes the backup to the object storage by transmitting the object 201 to the bucket 202A using the transfer path 204B according to the backup instruction 205b, and then notifies the control program 11A of the storage device 10A of the completion of the backup instruction 205b.

Next, the control program 11A of the storage device 10A receives the notification from the control program 11B of the storage device 10B, and notifies the integrated management device 20 that the backup instruction 205a is completed.

As described above, in the data backup to the cloud service using the remote replication according to Example 2, under the control of the storage device 10A, the data backup to the cloud 3A is performed using the pair relation of the remote replication 303. Accordingly, more stable and faster backup processing can be implemented.

Processing Flow of Data Backup to Object Storage

Figure 13:
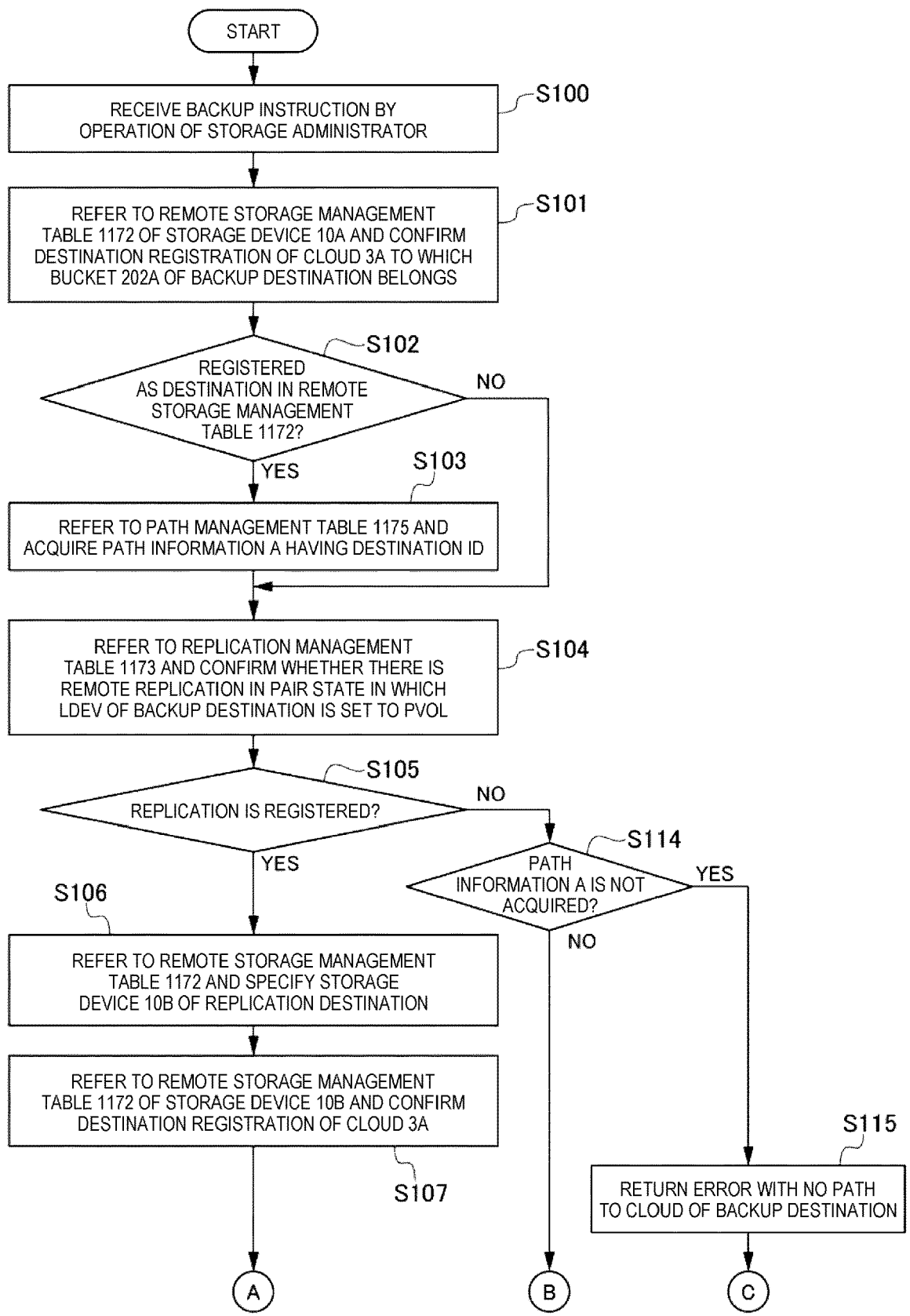
FIG. 13 is a flowchart (part 1) showing an example of a processing flow of a data backup processing method according to the embodiment of the invention.
Figure 14:
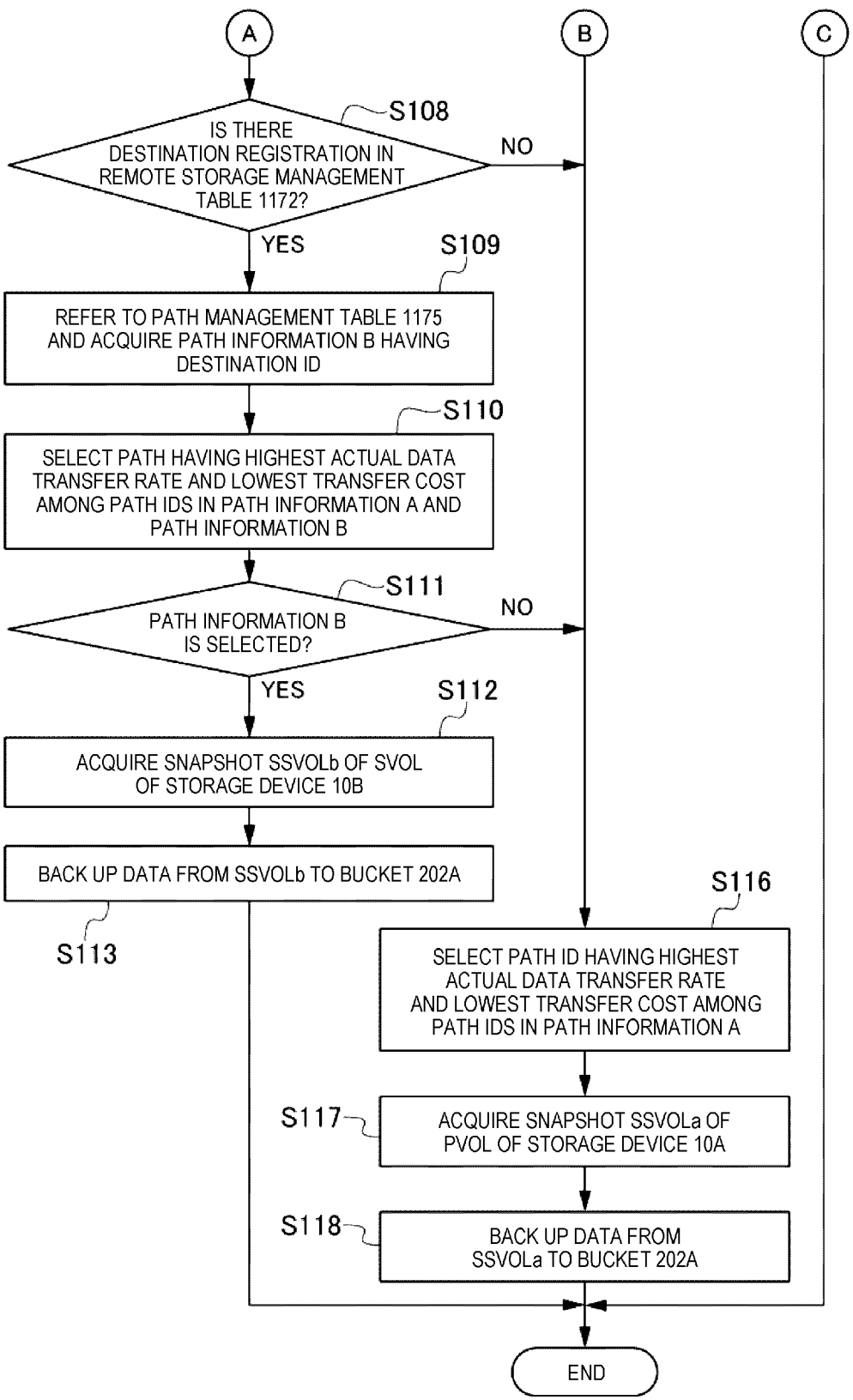
FIG. 14 is a flowchart (part 2) showing an example of the processing flow of the data backup processing method according to the embodiment of the invention.

Next, a data backup processing method in the storage system according to the embodiment of the invention will be described. The data backup processing method according to the present embodiment is a processing method of data backup to the object storage, which is executed under the control of the integrated management device 20. FIGS. 13 and 14 are flowcharts (part 1 and part 2) showing an example of a processing flow of the data backup processing method according to the embodiment of the invention.

Hereinafter, a processing flow in a system configuration in the case of the data backup to the cloud service using the remote replication according to Example 1, which is executed under the control of the integrated management device 20, will be described.

First, the integrated management device 20 receives, from the storage administrator 4, a backup instruction for backing up the PVOL 300 of the storage device 10A to the bucket 202A of the object storage 200 (step S100).

Upon receiving the backup instruction, the integrated management device 20 collects information for the backup path planning by the management control instruction unit 22 with respect to the storage device 10A which is a backup instruction target, and confirms whether the cloud 3A to which the bucket 202A of the backup destination belongs is registered as a destination by referring to the remote storage management table 1172 (step S101).

Next, the integrated management device 20 determines whether the cloud 3A is registered as the destination in the remote storage management table 1172 (step S102). If the integrated management device 20 determines that the cloud 3A is registered (YES in S102), the integrated management device 20 refers to the path management table 1175 of the storage device 10A, and acquires path information A (the path information has a plurality of path IDs) having the cloud 3A for the destination ID 601 of the destination (step S103), and then the processing proceeds to step S104.

In step S102, if the integrated management device 20 determines that the cloud 3A is not registered (NO in S102), or after the processing of step S103, the integrated management device 20 refers to the replication management table 1173 of the storage device 10A and confirms whether there is remote replication in the pair state in which the LDEV 13 of the backup destination is set to the PVOL 300 (step S104). Specifically, the integrated management device 20 checks whether there is an entry having the replication number 701 in which the replication type 702 is "Remote" and the pair state 706 is "PAIR" with the LDEV 13 of the backup destination as the PVOL 300.

Next, the integrated management device 20 determines whether there is the entry having the replication number 701 in which the replication type 702 is the "Remote" and the pair state 706 is the "PAIR" (step S105). Then, if integrated management device 20 determines that there is the entry (YES in S105), the integrated management device 20 refers to the remote storage management table 1172 of the storage device 10A to specify the storage device 10B in which the remote replication 303 is constructed from the entry extracted in step S105 (step S106).

Next, the integrated management device 20 refers to the remote storage management table 1172 of the storage device 10B, confirms the destination registration of the cloud 3A (step S107), and then determines whether there is a destination registration of the cloud 3A in the remote storage management table 1172 of the storage device 10B (step S108).

If it is determined in step S108 that the destination of the cloud 3A is registered in the remote storage management table 1172 of the storage device 10B (YES in S108), the integrated management device 20 refers to the path management table 1175 of the storage device 10B and acquires the path information B having the cloud 3A for the destination ID 601 of the destination (step S109).

Next, the integrated management device 20 selects a path ID having the highest actual data transfer rate and the lowest transfer cost among the path IDs in the path information A and the path information B (step S110), and then determines whether the selected path ID is the path information B (step S111).

If the integrated management device 20 determines that the selected path ID is the path information B (YES in S111), the integrated management device 20 gives the backup instruction 205 to the storage device 10B (step S112). After receiving the backup instruction 205, the storage device 10B selects the SVOL 301 as a backup source volume, acquires a snapshot of the SVOL 301 through the path 207 when latest data of the PVOL 300 having the pair relation is reflected, and creates the SSVOL 206b.

Next, the storage device 10B selects the SSVOL 206b as the backup source volume, converts the data of the SSVOL 206b into the object 201 by performing the data conversion processing by the data format conversion program 116, transfers the data to the bucket 202A using the transfer path 204B (step S113), and ends the backup processing.

In step S105, if the integrated management device 20 determines that there is no entry having the replication number 701 in which the replication type 702 is the "Remote" and the pair state 706 is the "PAIR" (NO in S105), the integrated management device 20 determines whether the path information A is not acquired (step S114).

If the path information A is not acquired (YES in S114), the path to the backup destination cloud 3B is not defined, and thus the integrated management device 20 performs error processing assuming that there is no path to the cloud 3B of the backup destination (step S115), and the backup processing ends.

When the integrated management device 20 determines in step S108 that there is no destination registration of the cloud 3A (NO in S108), determines in step S111 that the selected path ID is not the path information B (NO in S111), or determines in step S114 that the path information A is acquired (NO in S114), the processing proceeds to step S116. In step S116, the integrated management device 20 selects the path ID having the highest actual data transfer rate and the lowest transfer cost among the path IDs in the path information A (step S116).

Next, the integrated management device 20 gives the backup instruction 205 to the storage device 10A (step S117). After receiving the backup instruction 205, the storage device 10A selects the PVOL 300 as the backup source volume, acquires the snapshot of the PVOL 300 through the path 207, and creates the SSVOL 206a.

Next, the storage device 10A selects the SSVOL 206a as the backup source volume, converts the data of the SSVOL 206a into the object 201 by performing the data conversion processing by the data format conversion program 116, transfers the data to the bucket 202A using the transfer path 204A (step S118), and ends the backup processing.

According to the data backup processing method according to the embodiment of the invention described above, it is possible to implement the processing of backing up the stored data of the storage device installed on-premise to the storage service provided by the public cloud more stably and at a higher speed than when the backup is performed using an Internet line.

Modification

The invention is not limited to the embodiment described above, and it goes without saying that various other application examples and modifications can be obtained as long as the gist of the invention described in the claims is not deviated. For example, the embodiment described above describes the configuration of the system in detail and specifically in order to explain the invention in an easy-to-understand manner, and is not necessarily limited to one including all the described configurations. A part of the configuration of the present embodiment may be added to, deleted from, or replaced with another configuration.

What is claimed is:

1. A storage system comprising:
a first storage device having a first logical volume;
a second storage device having a second logical volume forming a remote replication pair with the first logical volume; and
an integrated management device configured to manage the first storage device and the second storage device, wherein
stored data of the first logical volume or stored data of the second logical volume is backed up to a storage service provided by a public cloud, and
when stored data of the first logical volume and stored data of the second logical volume are synchronized, the integrated management device or the first storage device selects, based on network conditions in a transfer path from the first storage device to the public cloud and in a transfer path from the second storage device to the public cloud, the first logical volume or the second logical volume as a backup source.

2. The storage system according to claim 1, wherein the integrated management device selects, based on transfer costs in the transfer path from the first storage device to the public cloud and in the transfer path from the second storage device to the public cloud, the first logical volume or the second logical volume as the backup source.

3. The storage system according to claim 2, wherein the second storage device is installed on a cloud connected to the same network as the public cloud.

4. A data backup processing method in a storage system, the storage system including
a first storage device having a first logical volume, and
a second storage device having a second logical volume forming a remote replication pair with the first logical volume,
the data backup processing method being used for backing up stored data of the first logical volume or stored data of the second logical volume to a storage service provided by a public cloud and comprising:
observing network conditions in a transfer path from the first storage device to the public cloud and in a transfer path from the second storage device to the public cloud when stored data of the first logical volume and stored data of the second logical volume are synchronized; and
selecting the first logical volume or the second logical volume as a backup source based on the network conditions.

* * * * *